ABA# UNITED STATES PATENT OFFICE.

RUSSEL B. CAPLES, OF GREAT FALLS, AND FREDERICK F. FRICK, OF ANACONDA, MONTANA, ASSIGNORS TO ANACONDA COPPER MINING COMPANY, OF ANACONDA, MONTANA, A CORPORATION OF MONTANA.

METHOD OF PURIFYING ZINC-SULFATE SOLUTIONS.

1,263,852.  Specification of Letters Patent.  Patented Apr. 23, 1918.

No Drawing. Application filed September 4, 1917. Serial No. 189,626.

*To all whom it may concern:*

Be it known that we, (1) RUSSEL B. CAPLES and (2) FREDERICK F. FRICK, citizens of the United States, residing at (1) Great Falls, (2) Anaconda, in the counties of (1) Cascade, (2) Deerlodge, and State of (1) Montana, (2) Montana, have invented certain new and useful Improvements in Methods of Purifying Zinc-Sulfate Solutions, of which the following is a specification.

This invention is a novel method of eliminating arsenic, or arsenic and antimony, from zinc sulfate solutions.

In the purification of such solutions it is customary to provide in the solution sufficient ferric iron to insure the precipitation of the whole of the arsenic and antimony in the form of ferric arsenate and ferric antimonate, respectively, when the solution is rendered neutral or basic and the iron thereby precipitated. In order to render the reaction quantitative as regards arsenic and antimony, some excess of iron is required.

Certain zinc-bearing materials contain more arsenic soluble in the lixiviant, or solution used for leaching, than can be precipitated by the iron dissolved from the same material by the same lixiviant. In such cases it has been customary to introduce the necessary additional quantity of iron into the solution, either by adding iron in soluble form to the solution itslf, or to the zinc-bearing material from which the solution is to be prepared. The iron-bearing precipitate is difficult of removal from the zinc sulfate solution, its removal involves some loss of zinc, and after removal is commonly discarded.

If, after neutralization of the zinc sulfate solution and precipitation of the ferric iron therefrom, it appears that the solution still contains some arsenic and antimony, the further purification, according to the methods heretofore practised, may be accomplished either by adding ferrous iron to the solution and oxidizing it therein to the ferric state, or by acidifying the solution, adding ferric iron, and again neutralizing the solution to precipitate the iron together with the arsenic and antimony. In case ferrous sulfate is used, it may be oxidized either by a current of air bubbled through the solution, or by such oxidizing agents as manganese dioxid or sodium peroxid. The use of air in this connection is a slow and expensive method, and the employment of peroxids of manganese and sodium is apt to introduce into the solutions products which may prove detrimental at a later operating stage, for example in the use of the solution as an electrolyte for the preparation of zinc.

According to the present invention, we avoid the waste of iron necessitated by the above described method, as well as the other objectionable features thereof. We have discovered that arsenic and antimony may be eliminated from zinc sulfate solutions by precipitating copper therefrom by means of zinc, preferably applied in the form of dust.

In case the solution containing zinc in the form of sulfate carries less than one part of copper by weight for each part by weight of arsenic and antimony calculated as trioxids, and no ferric iron, the copper-content should be brought at least to this proportion before the addition of the zinc dust, in order to insure the removal of all of the arsenic and antimony. The completeness of the reaction whereby the arsenic and antimony are precipitated is dependent in some measure upon the temperature of the solution as well as upon its copper-content. For example, if the temperature of the solution is less than about 80° C., an excess of copper above the quantity necessary to remove the arsenic and antimony at 80° C. is required.

The necessary increase in the copper-content of the solution may be brought about by any desired or convenient method, as for example by the addition of copper sulfate to the solution prepared from the zinc-bearing materials, or to the material to be leached, or simply by adding roasted copper-bearing ores to the material to be leached. In case the zinc-bearing material requires to be roasted before leaching, the copper may be added as unroasted copper ore to the unroasted zinc-bearing material.

In case the zinc-bearing solution containing arsenic and antimony contains also sufficient ferric iron to precipitate a portion of the arsenic and antimony, it is not necessary to add more than enough copper to remove the arsenic and antimony which would remain in solution after the precipitation of the iron.

The precipitate obtained by the addition of zinc-dust to the zinc-bearing solution containing copper is not only easily removable from the solution with minimum losses of zinc, but constitutes a valuable product for the copper smelter, affording a practically complete recovery of the copper-content of the material added to the zinc-bearing solution or material. This is true whether the copper be added as copper sulfate, as roasted copper ore, or in the form of unroasted sulfid.

We claim:—

1. The method of purifying zinc sulfate solutions, which consists in precipitating arsenic and antimony therefrom in association with copper, by treating the solution, containing a sufficient proportion of a dissolved copper salt, with metallic zinc.

2. In the purification of zinc sulfate solutions, the steps which consist in preparing a solution containing at least one part by weight of copper for each part by weight of arsenic and antimony to be eliminated, calculated as trioxids, and subjecting the said solution at a temperature of about 80° C. to the action of metallic zinc, whereby arsenic and antimony are precipitated in association with copper.

In testimony whereof, we affix our signatures.

RUSSEL B. CAPLES.
FREDERICK F. FRICK.